United States Patent [19]

Louth et al.

[11] 4,180,701

[45] Dec. 25, 1979

[54] PHASE LOCK LOOP FOR DATA DECODER CLOCK GENERATOR

[75] Inventors: Kenneth Louth, Menlo Park; Luigi C. Gallo, Redwood City, both of Calif.

[73] Assignee: Ampex Corporation, Redwood City, Calif.

[21] Appl. No.: 763,793

[22] Filed: Jan. 28, 1977

[51] Int. Cl.² ............................................. H04L 7/02
[52] U.S. Cl. ...................................... 178/69.1; 358/4
[58] Field of Search ............................ 178/53, 69.1; 179/15 BS; 331/1 R, 1 A, 8, 10, 14; 325/418, 419, 422; 360/26, 28; 329/122, 124; 328/133

[56] References Cited

U.S. PATENT DOCUMENTS

| 3,896,265 | 7/1975 | Hard et al. | 178/69.1 |
| 3,991,378 | 11/1976 | Schaefer | 331/14 |

Primary Examiner—Benedict V. Safourek
Attorney, Agent, or Firm—Robert G. Clay; Ralph L. Mossino

[57] ABSTRACT

Apparatus is disclosed for phase locking the output of a voltage controlled oscillator to a self-clocking data pulse stream occurring at a basic predetermined rate, the data stream being of the kind in which the data content is determined by a signal state change located in one of two positions within the data cell interval of the data stream. Each signal state change is defined by a narrow data pulse. The oscillator is controlled by a first means to operate at the predetermined rate when the data pulses are not present and by a second means when the data pulses are present. The second means compares one selected transition of the clock pulses of the oscillator output signal to the position of the data pulse and provides a variable control voltage to the oscillator to adjust its phase so that the the selected clock pulse transition is synchronized to occur at the midpoint of the data pulses.

6 Claims, 14 Drawing Figures

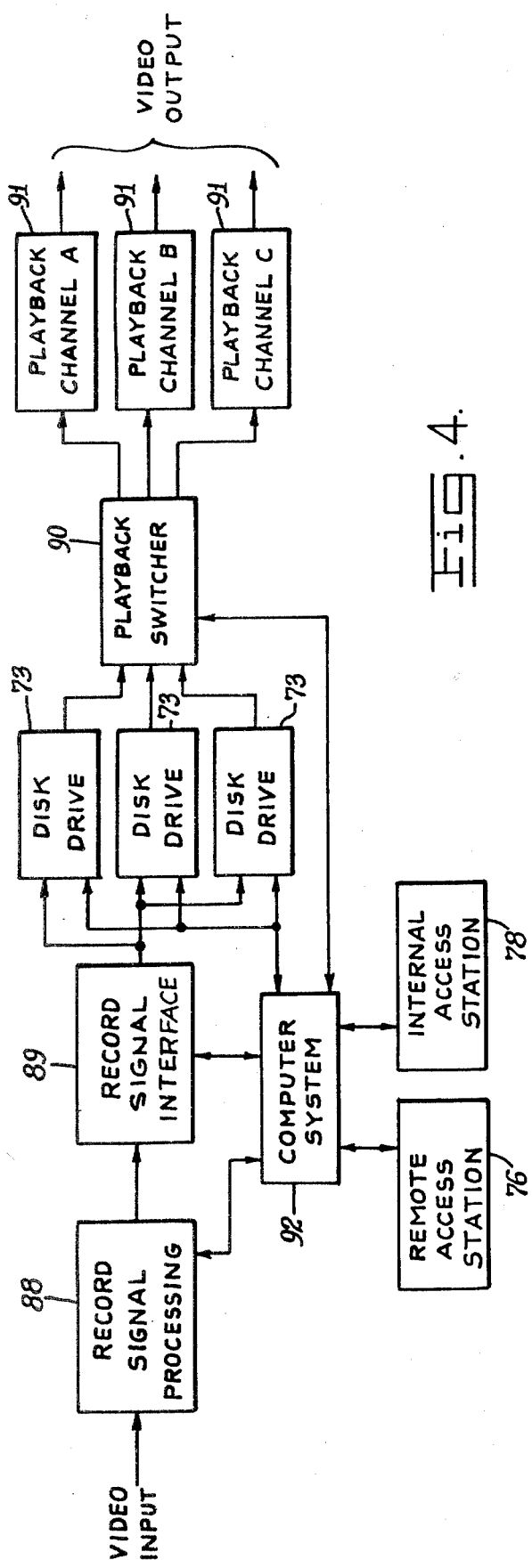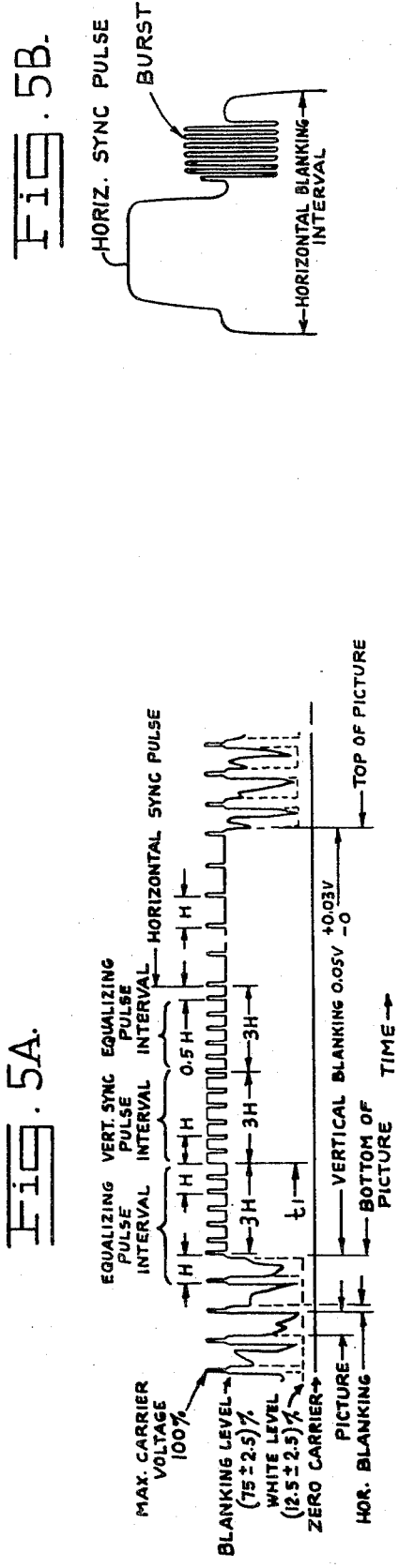

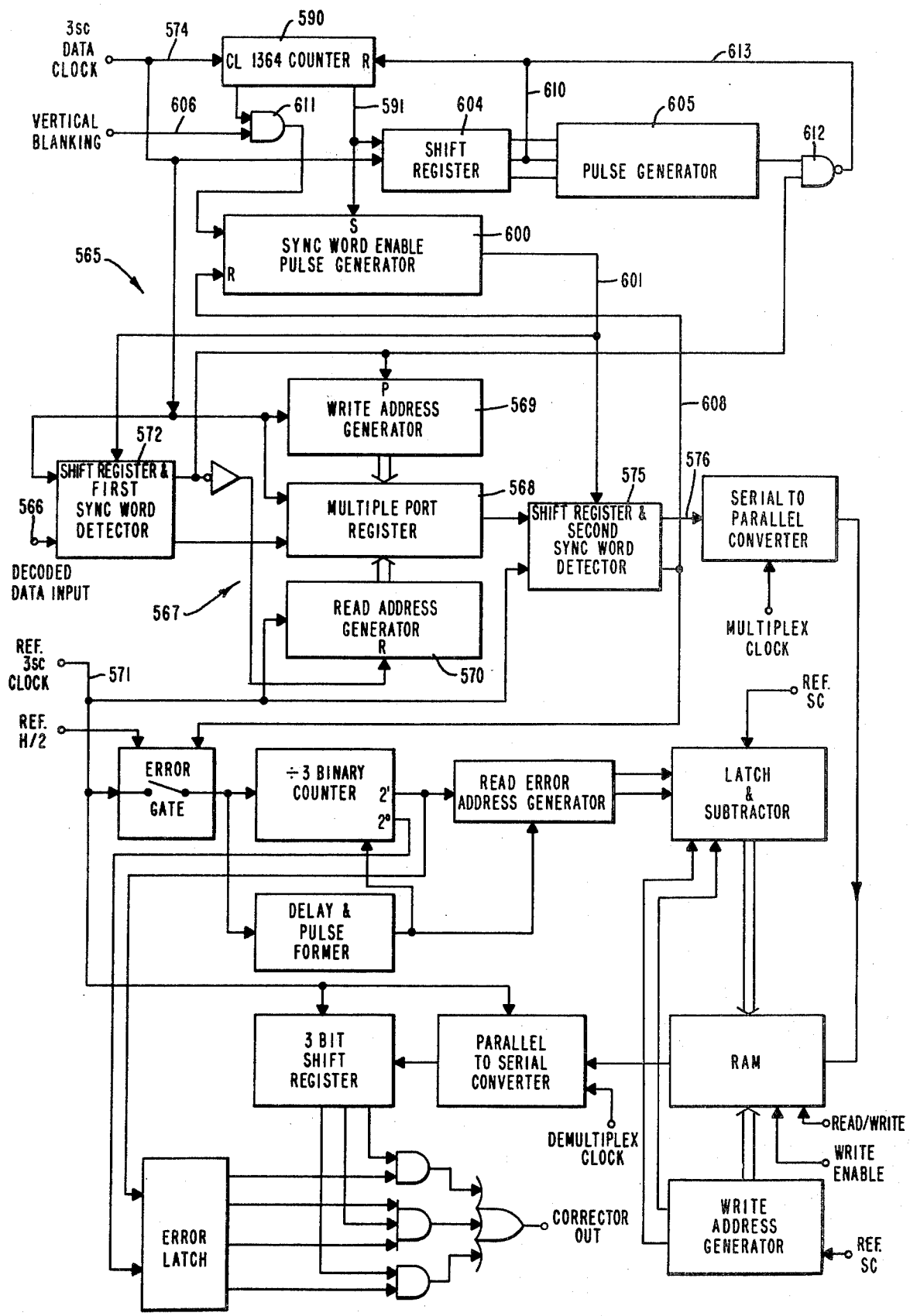
FIG_8A

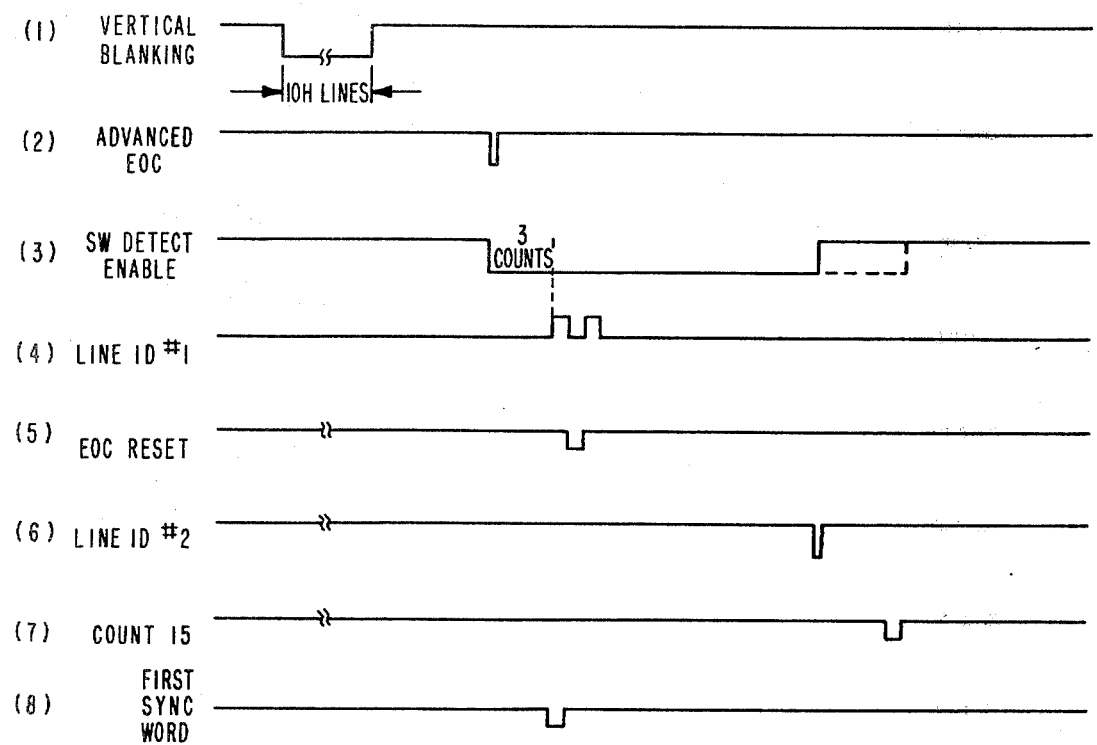
FIG_8B

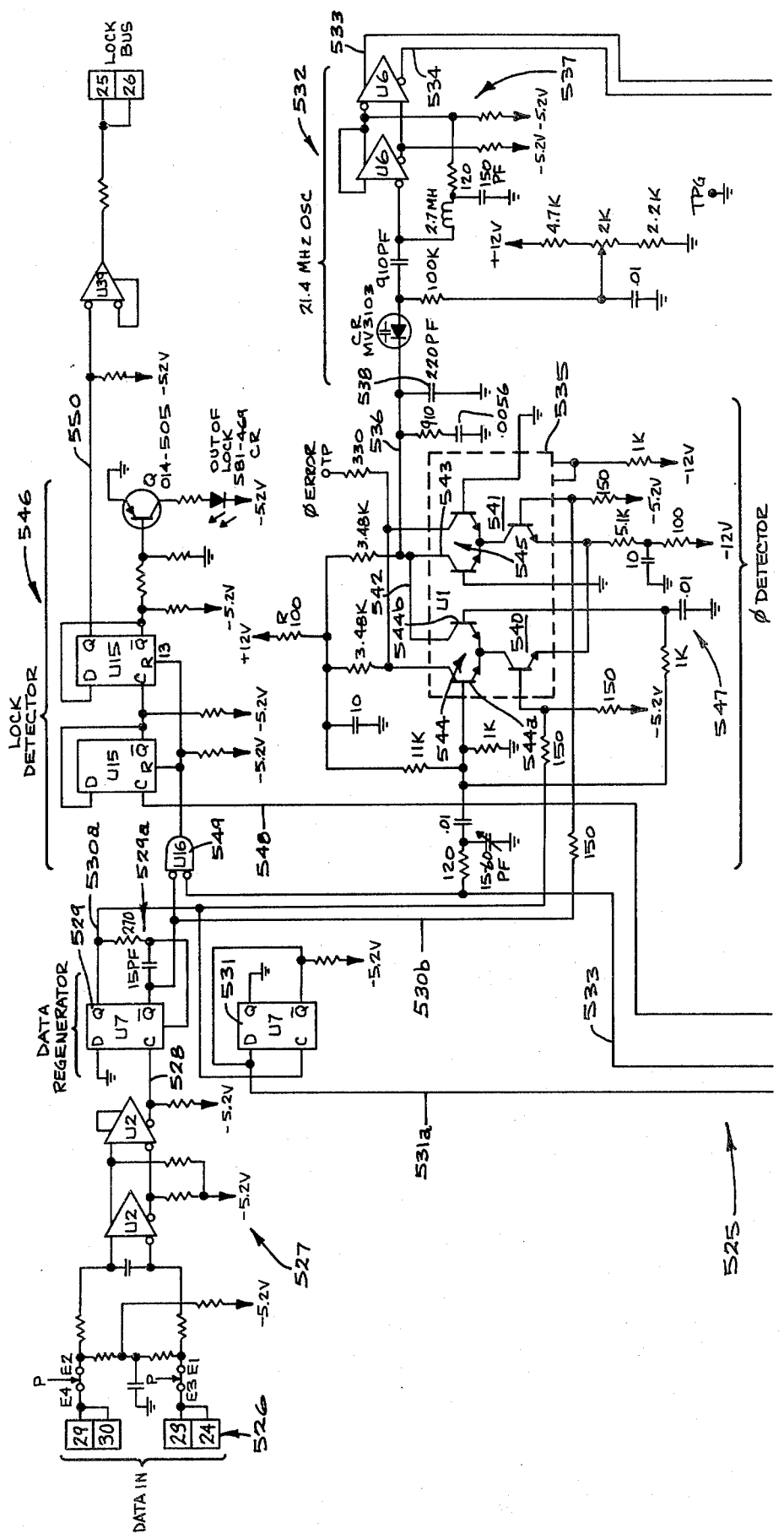

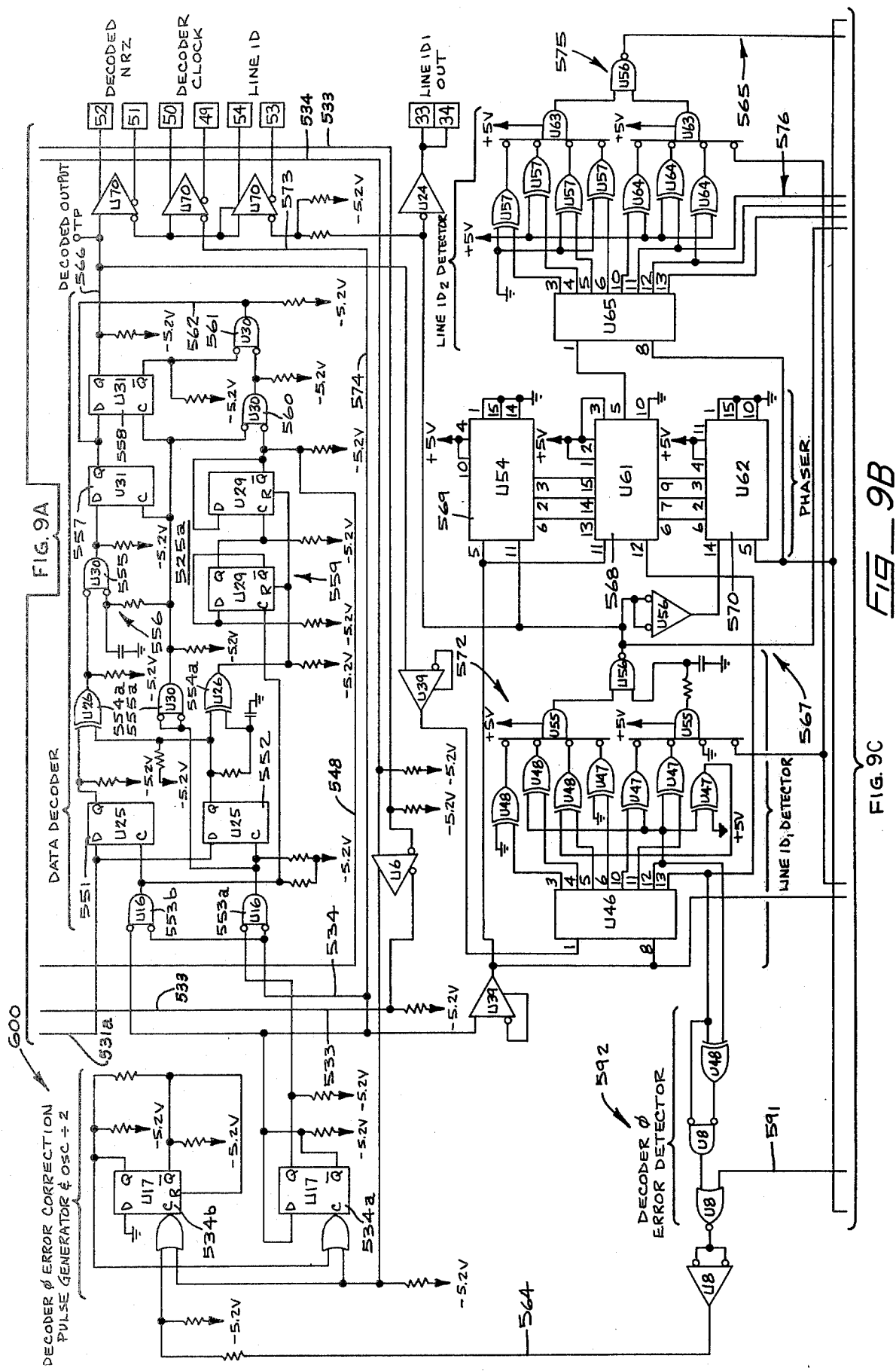

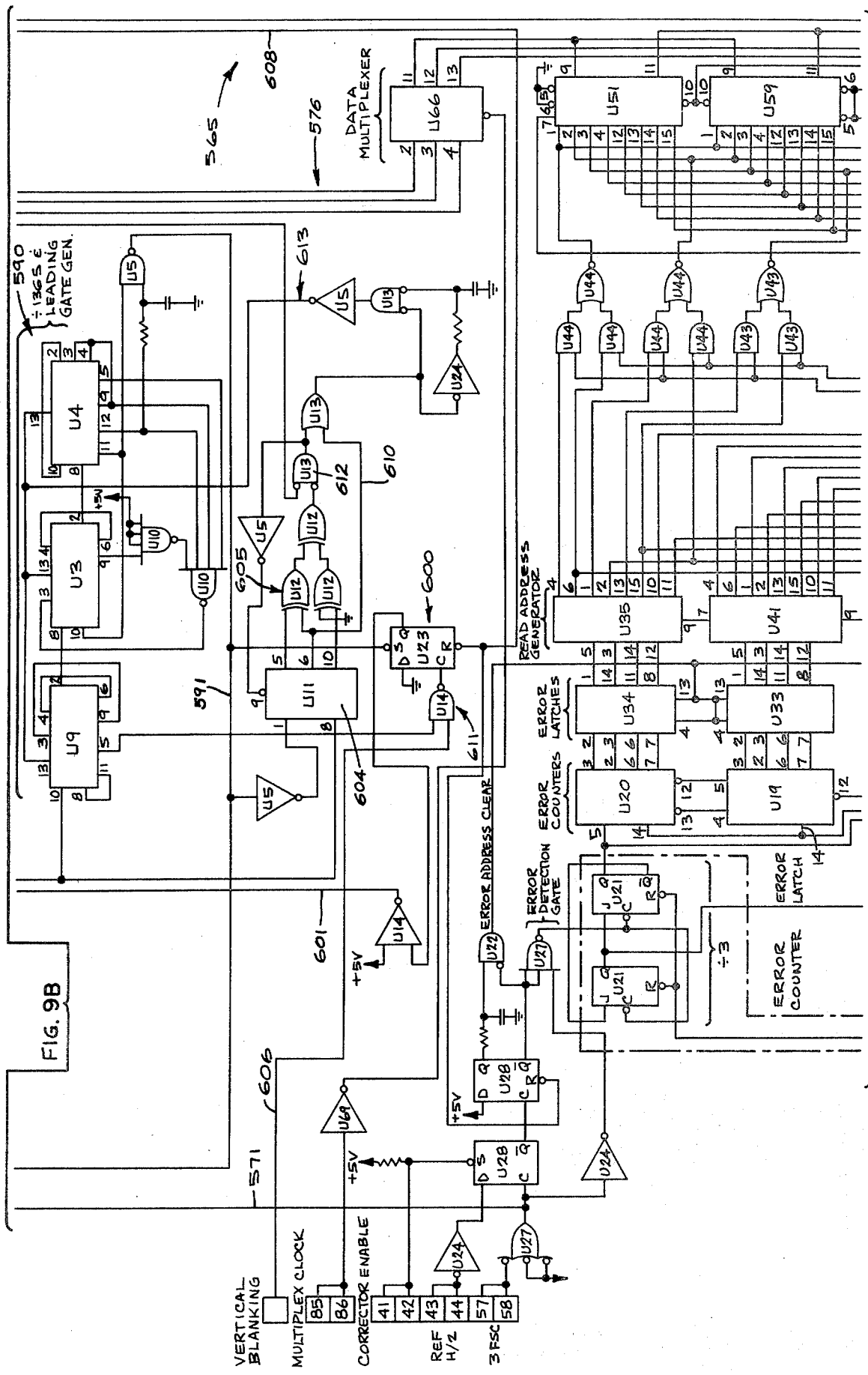

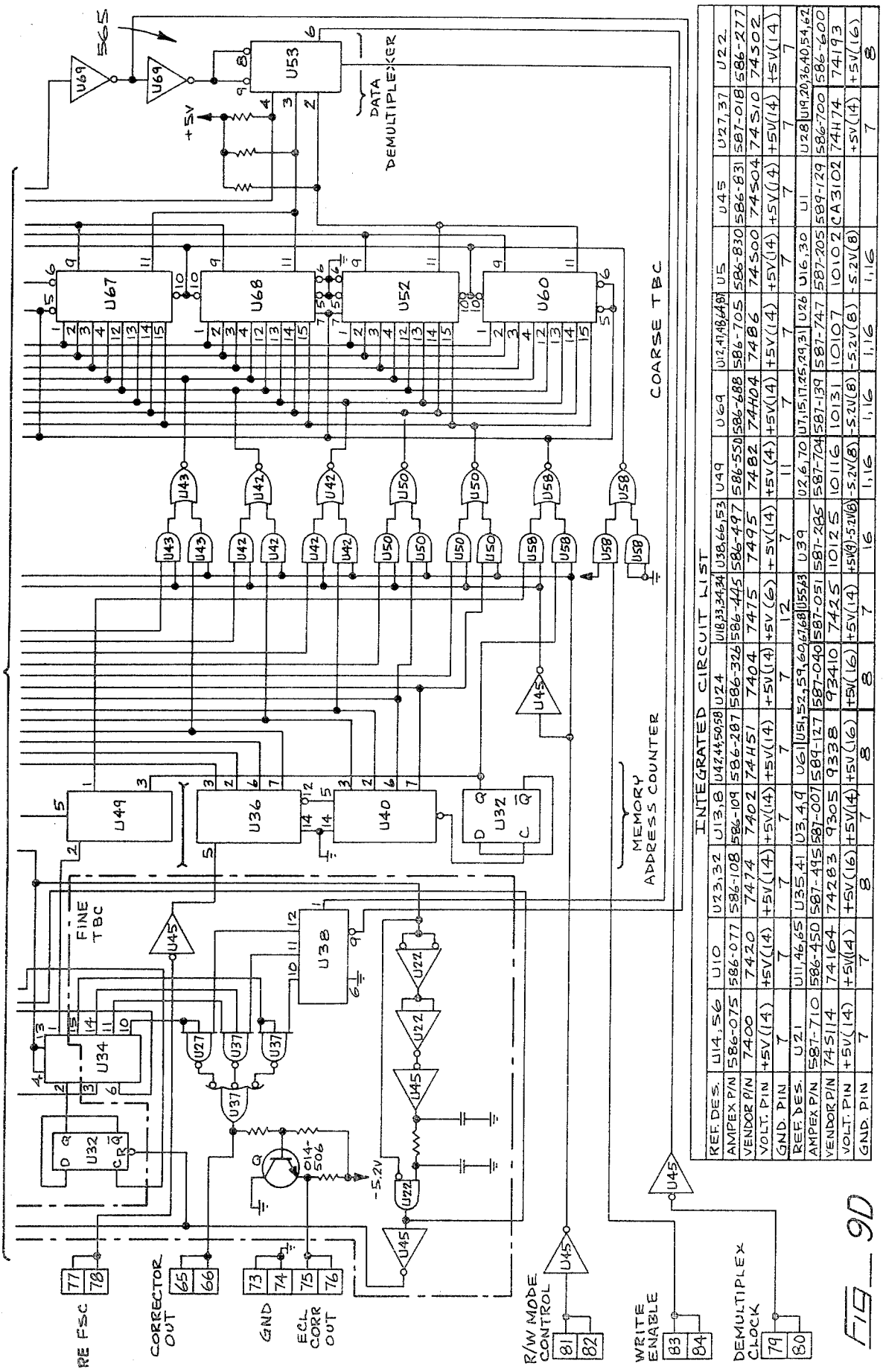

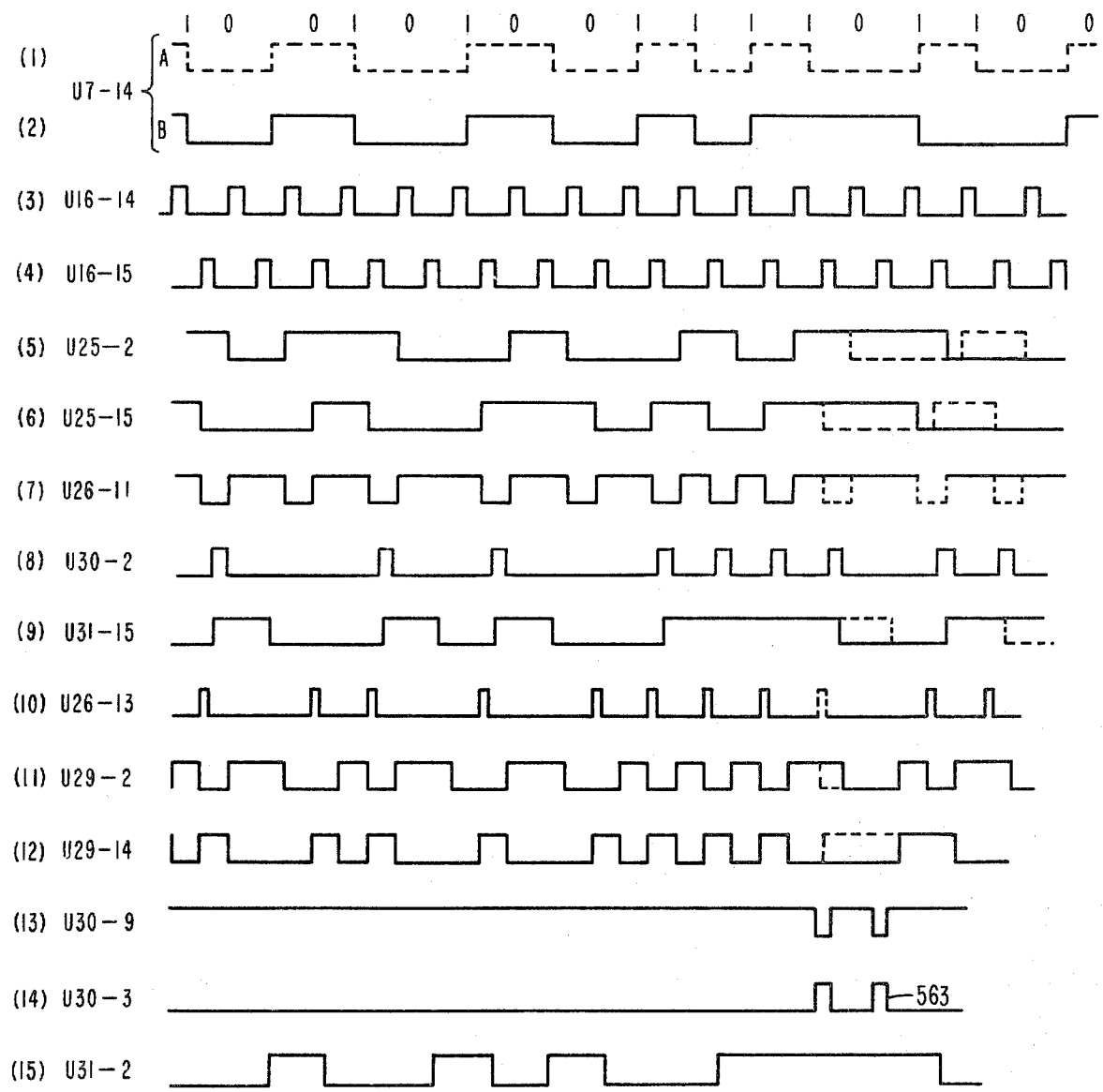
FIG_9E

PHASE LOCK LOOP FOR DATA DECODER CLOCK GENERATOR

CROSS REFERENCE TO RELATED APPLICATIONS

VIDEO FRAME STORAGE RECORDING AND REPRODUCING APPARATUS, Ser. No. 763,371, filed Jan. 28, 1977, by Joachim P. Diermann and Thomas W. Ritchey, Jr.

PLAYBACK APPARATUS ASSIGNMENT MEANS, Ser. No. 763,462, filed Jan. 28, 1977, by Howard W. Knight and Edwin W. Engberg, now abandoned.

TELEVISION SIGNAL DISC DRIVE RECORDER, Ser. No. 763,795, filed Jan. 28, 1977, by Howard W. Knight and Edwin W. Engberg.

DISC DRIVE RECORDING PROTECTION APPARATUS, Ser. No. 763,761, filed Jan. 28, 1977, by Edwin W. Engberg.

TELEVISION SUBCARRIER PHASE CORRECTION FOR COLOR FIELD SEQUENCING, Ser. No. 763,942, filed Jan. 28, 1977 by Luigi C. Gallo.

METHOD AND APPARATUS FOR PROVIDING DC RESTORATION Ser. No. 763,461, filed Jan. 28, 1977, by Luigi C. Gallo.

METHOD AND APPARATUS FOR INSERTING SYNCHRONIZING WORDS IN DIGITIZED TELEVISION SIGNAL DATA STREAM, Ser. No. 763,463, filed Jan. 28, 1977, by Luigi C. Gallo.

PRECISION PHASE CONTROLLED CLOCK FOR SAMPLING TELEVISION SIGNALS, Ser. No. 763,453, filed Jan. 28, 1977, by Daniel A. Beaulier, Luigi C. Gallo.

DIGITAL TELEVISION SIGNAL PROCESSING SYSTEM, Ser. No. 763,941, filed Jan. 28, 1977, by Luigi C. Gallo.

CLOCK SIGNAL GENERATOR PROVIDING NONSYMMETRICAL ALTERNATING PHASE INTERVALS, Ser. No. 763,792, filed Jan. 28, 1977, by Daniel A. Beaulier and Luigi C. Gallo.

A CIRCUIT FOR DIGITALLY ENCODING AN ANALOG TELEVISION SIGNAL, Ser. No. 762,901, filed Jan. 26, 1977, by Daniel A. Beaulier.

HIGH BIT RATE DATA ENCODER FOR DATA TRANSMISSION SYSTEM, Ser. No. 763,762, filed Jan. 28, 1977, by Luigi C. Gallo.

DATA RATE AND TIME BASE CORRECTOR, Ser. No. 763,794, filed Jan. 28, 1977, by Luigi C. Gallo, now abandoned.

A DIGITAL CHROMINANCE SEPARATING AND PROCESSING SYSTEM AND METHOD, Ser. No. 763,251, filed Jan. 26, 1977, by Robert P. MacKenzie, abandoned in favor of continuation application, Ser. No. 765,563, filed Feb. 4, 1977.

FREQUENCY RESPONSE EQUALIZER, Ser. No. 762,902, filed Jan. 26, 1977, by Jerry W. Miller and Luigi C. Gallo.

A CIRCUIT FOR GENERATING A DIGITAL DELETED DATA, BLINKING CROSS SIGNAL WHICH IS STORED IN A DELETED TRACK AND SELECTIVELY DISPLAYED FOR DETECTION, Ser. No. 762,903, filed Jan. 26, 1977, by Luigi C. Gallo and Junaid Sheikh, abandoned in favor of continuation application, Ser. No. 765,564, filed Feb. 4, 1977.

BACKGROUND AND FIELD OF THE INVENTION

The present invention generally relates to phase locked pulse generators apparatus and, more particularly, to such generators that are adapted to generate pulses synchronized to digital data streams.

The continued advances in technology have resulted in many changes in the equipment that is currently being used in television broadcast stations. One of the more recent changes that has evolved is the shift away from photographic techniques toward the use of magnetic media in many phases of the operation of the commercial broadcast television station. For example, feature films being broadcast often originate from magnetic tape rather than film and television station news departments are increasingly converting to videotape recording systems rather than using film cameras to provide the visual coverage of the news stories. Moreover, many systems utilize travelling transmitters that can either broadcast on location coverage or transmit such coverage to the station which can either be broadcast "live" or videotaped, edited and broadcast at a later time. Some of the many benefits of these techniques are the ease of handling, flexibility and speed of processing compared to the use of photographic film, coupled with the ability to reuse the magnetic tape when the information that is recorded on them is no longer needed.

One of the last remaining film domains in the present day commercial television broadcasting station is the Telecine island which uses 35 millimeter film transparencies. The Telecine island is used to provide video still images that are used during programming, commercials, news and the like, i.e., wherever a still image may be used during operation. Their use is extensive as is evidenced by the fact that the average commercial broadcast television station maintains a total file on the order of about 2000 to 5000 35 millimeter transparency slides. The maintenance of the total file represents a laborious operation which requires introduction of new slides, the discarding of obsolete slides and the maintenance of an accurate index so that they can be readily obtained when needed. When slide program sequences are to be assembled, they must be manually carried to the Telecine island, cleaned and manually loaded. Even with the cleaning operation, dust particles and scratches and the like may easily result in an unsatisfactory end product even when the projectionist is careful. Moreover, following their use during broadcasting, the slides must be removed and returned to the file. The entire assembling, use and refiling of the slides represents a substantial labor investment because of the many manual operations that are required. The Telecine operation is considered to be one of the most antiquated operations in many modern broadcast stations and is basically incompatible with a fully automated station operation.

In contrast to the Telecine island or the use of opaque graphic material as the source for generating video still images, the present invention facilitates the use of a recording and playback apparatus that will record and reproduce still images, with the still image video information being stored on magnetic media. The magnetic recording and playback apparatus utilizing the present invention facilitates the use of a self clocking digital data code to transmit digital data between distant points and, hence, the use of standard computer disc drives (though modified in some respects) as the magnetic storage media and thereby eliminates the many problems that are associated with slide transparencies. Since the still images are recorded on magnetic media, the problems of physical degradation during use, e.g., dust particles and scratches, are not experienced. Moreover, since the recorded information can be easily accessed, the same still image may be used by operators at different locations almost simultaneously.

The present invention is a phase locked clock generator for use in decoding a digital data stream of the kind in which the data content is determined by a sequence of signal state changes, either in the form of narrow data pulses or signal level transitions, each change being located in one of two positions within a data cell interval. The phase locked clock generator is useful for decoding digital data streams in which the signal state changes are located at either an edge position or a midpoint position of the data cell interval. The exemplary embodiment of the phase locked clock generator is disclosed herein as used in a decoder arranged to decode digital data streams encoded according to the code rules described in either U.S. Pat. No. 3,108,261 or No. 4,027,335. As will be described hereinbelow, digital data streams encoded according to each of the code rules described in those patents have signal state changes located at either the edge or midpoint positions of the data cells. The phase locked clock generator is arranged to provide clock pulses at a nominal rate of two times the encoded data clock rate so that, when properly phase locked, a clock pulse will be provided synchronously with the edge and midpoint positions of each data cell of the encoded digital data stream. For phase locking the clock generator, a narrow data pulse corresponding to each signal state change is provided to a phase comparator for comparison with the clock pulses. The phase comparator includes a current source that responds to the data and clock pulses to provide current to a charging circuit for an interval determined by selected edge transitions of the pulses received by the comparator. The charging circuit is coupled to the clock generator so that the generator is servoed to provide clock pulses to the phase comparator with its selected edge transition located at the midpoint of the narrow data pulse. In the absence of data pulses, the current source is controlled to provide current to the charging circuit that maintains the clock signal provided by the clock signal generator at a nominal frequency and phase.

While the phase locked clock pulse generator of the present invention is suited for use in apparatus for recording and reproducing still images and a preferred embodiment is described herein as arranged for such use, the phase locked clock pulse generator can be arranged for other uses wherein digital data in a self clocking code form is required to be decoded.

OBJECT OF THE INVENTION

Accordingly, it is an object of the present invention to provide an improved phase locked clock generator for decoding digital data.

It is another object of the present invention to provide such a phase locked clock generator that is arranged for use in decoding self clocked digital data of the kind having its data content determined by signal state transitions located at one of two positions of each data cell interval.

Another object of the present invention is to provide an phase locked clock generator of the foregoing type which provides nominal frequency and phase clock signals in the absence of digital data.

Other objects and advantages will become apparent upon reading the following detailed description in conjunction with the attached drawings.

DESCRIPTION OF THE DRAWINGS

FIG. 4 is a broad functional and simplified block diagram of the entire apparatus of the present invention;

FIG. 5A illustrates a portion of a typical television signal illustrating the vertical interval thereof;

FIG. 5B illustrates a portion of a color television signal, particularly illustrating the horizontal synchronization pulse and color burst signal;

FIG. 8A is a functional block diagram of the data rate and time base corrector circuitry which is a portion of the signal system shown in FIG. 6;

FIG. 8B is a timing diagram for the data rate and time base corrector circuitry shown in FIG. 8A;

FIGS. 9A, 9B, 9C and 9D together comprise an electrical schematic diagram of the data decoder and the data rate and time base corrector circuitry of the signal system shown in the block diagram of FIG. 8A; and FIG. 9E is a timing diagram illustrating the operation of the data decoder circuitry shown in FIGS. 9A and 9B.

Referring to FIGS. 1-3, a recording and reproducing apparatus is illustrated, indicated generally at 70 in FIG. 1 which indludes two bays 71 and 72 containing electrical circuitry associated with the apparatus, together with the various monitoring and control hardware shown specifically in the upper portion of the bay 72. The system also includes a pair of disc drives 73 located adjacent the rightward bay 72 with each of the disc drives 73 having a disc pack 75 mounted thereon. While two disc drive units are specifically illustrated in FIG. 1, it should be understood that there may be additional disc drives used with the system to increase the on-line storage capacity of the apparatus. It should also be appreciated that a single disc drive may be used. Operational control of the apparatus is performed by one or more operators using either one of many remote access stations, such as the remote access station 76 shown in FIG. 2, or an internal access station 78 which is located in the bay 72. If desired, a video monitor 79, vector and "A" oscilloscopes 80 may be provided as shown in bay 72. Phase control switches 81 are provided above the internal access station 78.

Figure 1:
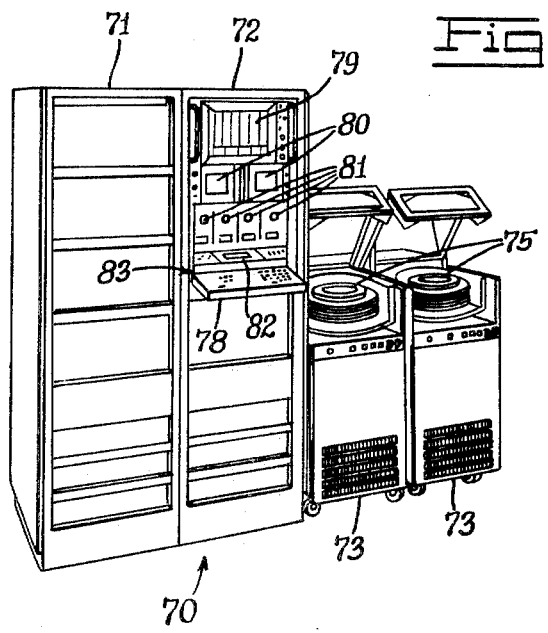
FIG. 1 is a perspective view of the apparatus embodying the present invention, illustrating its overall appearance, including the internal access station and two disc drive units.
Figure 2:
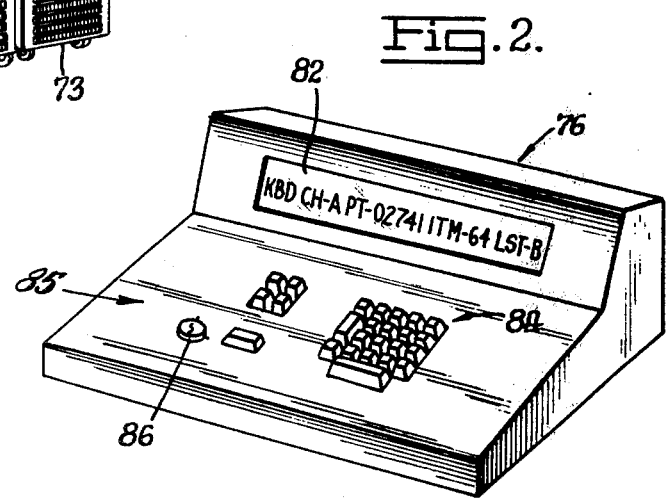
FIG. 2 is an enlarged perspective view illustrating a representative remote access station that an operator can use to control the operation of the apparatus of the present invention.
Figure 3:
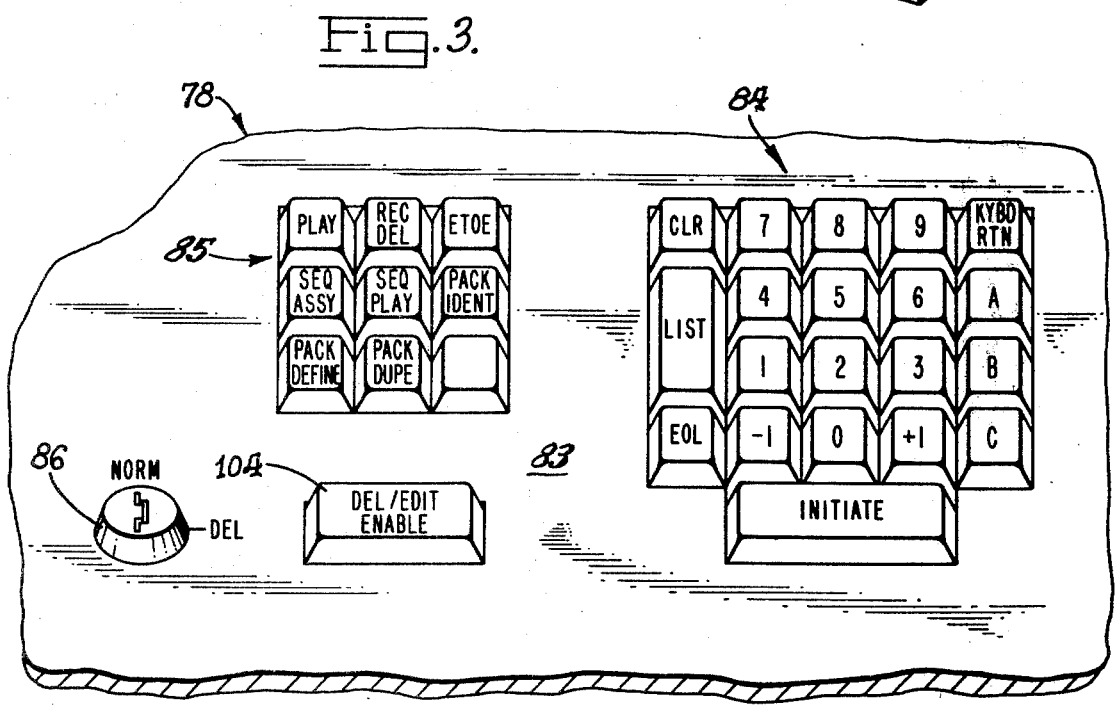
FIG. 3 is an enlarged top view of a portion of the internal access station keyboard shown in FIG. 1 particularly illustrating the various keys and bars that an operator uses during operation.

The apparatus is controlled by an operator using either the internal access station 78 or a remote access station 76, both types of which have a keyboard with numerical and function keys and bars, a 32 character display 82, which provides a readout of information that is needed to carry out functional operations during use, as well as to display the information concerning the identity of certain stills being addressed and other information. It should be understood that the remote access station 76 shown in FIG. 2 is representative of each of the remote access stations and up to seven remote access stations can be used to control the apparatus 70. The internal access station keyboard indicated generally at 83 in FIG. 1, as shown in the enlarged fragmentary view in FIG. 3, has more expanded operational capability than the remote access stations, whose keyboards have fewer function keys. The keyboard contains a large cluster of keys indicated generally at 84 and a smaller cluster of function keys 85 located on the left side of the keyboard. Additionally, a turn key controlled switch 86 may be provided to switch between normal and delete operations to safeguard against the possibility of inadvertent or unauthorized erasure of actively used stills.

Referring to the very simplified block diagram shown in FIG. 4, the apparatus receives a video input signal which is processed by record signal processing circuitry 88 and is then applied to record signal interface circuitry 89 which directs the signal to all of the disc drives 73. Gating circuitry located within a selected disc drive 73 is enabled to allow the signal to be recorded on a selected drive. More than one disc drive 73 can be simultaneously selected for recording the video signal provided by the record signal interface circuitry 89. Switcher circuitry can be substituted for the signal interface and associated gate circuitry so that the signal provided by the record signal processing circuitry 88 is coupled only to selected disc drives having the disc packs 75 upon which the signal is to be recorded. During playback, a signal originating from one of the disc drives is applied to the playback switching circuitry 90 which directs it to one of the playback channels 91, each of which provides a video output channel. A computer control system 92 is interfaced with the record processing circuitry, signal interfacing and switching circuitry and disc drives for controlling the overall operation of the various components of the apparatus and also interfaces the remote access stations and internal access station. The circuit details of the computer control system 92 and of the access stations 76 and 78 for controlling the recording and reproducing apparatus 70 are described in the above-identified related application, Ser. No. 763,371. An operator can select a particular disc in which to store a still, provided that the disc pack is online, i.e., it is physically loaded on one of the disc drives 73. In this regard, it should be understood that the apparatus addresses disc packs rather than disc drives for the reason that the apparatus is adapted to identify up to 64 separate disc packs, only one of which can be located on a disc drive at any one time. Thus, in the event the apparatus has two disc drives, only two disc packs can be on-line at one time. The operator can use an access station keyboard 83 to enter the address of a disc pack upon which he wishes to record a still and, through the interaction of the computer with the disc drive on which the selected disc pack is loaded, can carry out the recording operation on the selected on-line disc pack. Similarly, an operator can play back a still frame from the disc pack on one of the disc drives and can define the playback channel that he wishes the still frame to be played through.

The apparatus has four major operating modes or conditions, i.e., (1) record/delete, (2) playback or reproduce, (3) sequence assembly and (4) sequence play. The record and play operations will be initially described, while referring to FIGS. 6 and 7 which illustrate somewhat simplified block diagrams of the signal flow paths during recording and playback, respectively, with respect to one of the disc drives 73.

Figure 6:
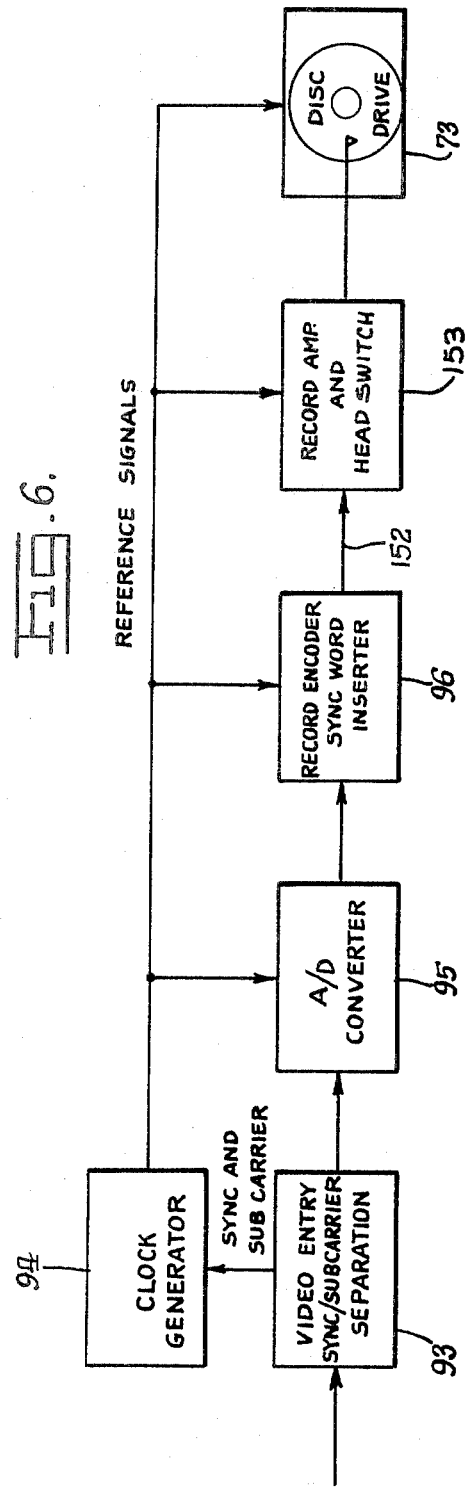
FIG. 6 is a functional block diagram broadly illustrating the signal flow path through the apparatus during a record operation.

Turning first to the record signal flow block diagram of FIG. 6, the composite video input signal is applied to the input stage circuitry 93 where clamping of the signal takes place and the synchronization and subcarrier components are stripped from the composite video signal. The composite video signal of an NTSC system is illustrated in FIGS. 5A and 5B. The input stage also regenerates the synchronization (hereafter often referred to as "sync") and subcarrier signals for later use during reproduction and, accordingly, the regenerated sync and subcarrier signals are directed to a clock generator 94 which also generates reference signals that are used by the downstream elements during operation. The clamped analog video signal with the color burst component is then applied to an analog-to-digital converter (A/D) 95 which provides an output signal at a sample rate of 10.7 megasamples per second, with each of the samples comprising 8 bits of information. The digital video signal is a non-return to zero code (NRZ) which means that it is a binary code defining a ONE as a high level and a ZERO as an equivalent low level. A signal level transition occurs between the low and high levels when different digital data bits occur in successive data cell intervals. The digitized video signal appears on 8 parallel lines, i.e., one bit per line, which is applied to an encoder and sync word inserter 96 which converts the digitized video into a special recording code (referred to herein as a Miller code or a Miller squared code) that is particularly suitable for digital magnetic recording in that it minimizes DC content of a data stream. The circuitry also inserts a synchronizing word on alternate television lines with respect to a particular phase angle of the color subcarrier as represented by the color burst sync component. The sync word is used as a reference for correcting time base and skewing errors that occur during playback among the eight parallel bits of data that must be combined to define the value represented by each sample. The digital video information in the eight parallel lines is then applied to a recording amplifier circuitry and head switch circuitry 153 associated with the selected disc drive 73 which switches between two groups of eight recording heads for recording the digitized video signal by the disc drive. The disc drive is servo controlled so that its spindle rotational speed is locked to vertical sync, with the rotational disc speed being 3600 revolutions per minute. By locking the spindle drive to vertical sync, the apparatus records one television field per revolution of the disc pack and simultaneously records the eight data streams on eight disc surfaces. At the completion of recording one field, the recording amplifier circuitry and head switch circuitry 153 is commanded to activate another set of heads for simultaneously recording the second field of a television frame on another set of eight disc surfaces so that a picture frame, i.e., two interlaced television fields is recorded on two revolutions of the disc drive, using 16 heads. Each disc pack located on a disc drive preferably contains 815 cylinders, each of which has 19 recording surfaces and can therefore store 815 digital television frames. There is one read/write head for each of the 19 disc recording surfaces of a disc pack and all heads are mounted vertically aligned on a common carriage whose position is controlled by a linear motor. It should be understood that a cylinder is defined to comprise all recording surfaces that are located on the same radius of a disc pack. However, the term track, rather than cylinder, is preferred herein and, accordingly, a track is meant to include all recording surfaces on a same radius, i.e., all surfaces on a cylinder. Thus, an addressed track for recording or playing back a still actually refers to the 19 individual surfaces on the cylinder available at that radius. Of the 19 surfaces that are available for recording, one is used to record the address and other housekeeping information, rather than active video information, and it is specifically referred to as the "data track". Two of the 19 surfaces are available for recording a parity bit and 16 surfaces are used to record the picture frame of video data. Also one of the heads, generally referred to as the servo head, travels on the 20th disc pack surface that contains only servo track information prerecorded by the pack manufacturer. The servo tracks carry out two functions, i.e., following a seek command the head stack traverses servo tracks that are counted to determine the instantaneous location of the heads and, after completion of a seek phase, the servo head generates an error signal that is used to control the linear motor position to hold the head carriage centered on the appropriate servo track. By using such a feedback system, it is possible to achieve a radial packing density of about 400 tracks per inch or a total of 815 tracks per disc pack.

Since the present apparatus does not record analog video signals because of frequency response limitations of disc pack memories, the video signal is digitized for recording. Because the digitized signal is recorded, the video signal to noise ratio of the system is primarily determined by quantization noise rather than recording media and preamplifier noise as is the case with conventional videotape recorders. Thus, the present apparatus delivers a signal to noise ratio of about 58 dB and effects such as moire and residual time base error do not exist, the digital random error of the storage channels being typically low enough to make occasional transmission errors virtually invisible.

By recording a digital data stream at a rate of 10.7 megabits per second on each of the eight disc surfaces, the linear packing density of the apparatus is about 6000 bits per inch which is about 60% greater than is used in conventional disc drive usage in data processing. The circuit details of the record circuitry and the disc drive control circuitry for record operations are described in the above-identified related application, Ser. No. 763,371.

Figure 7:
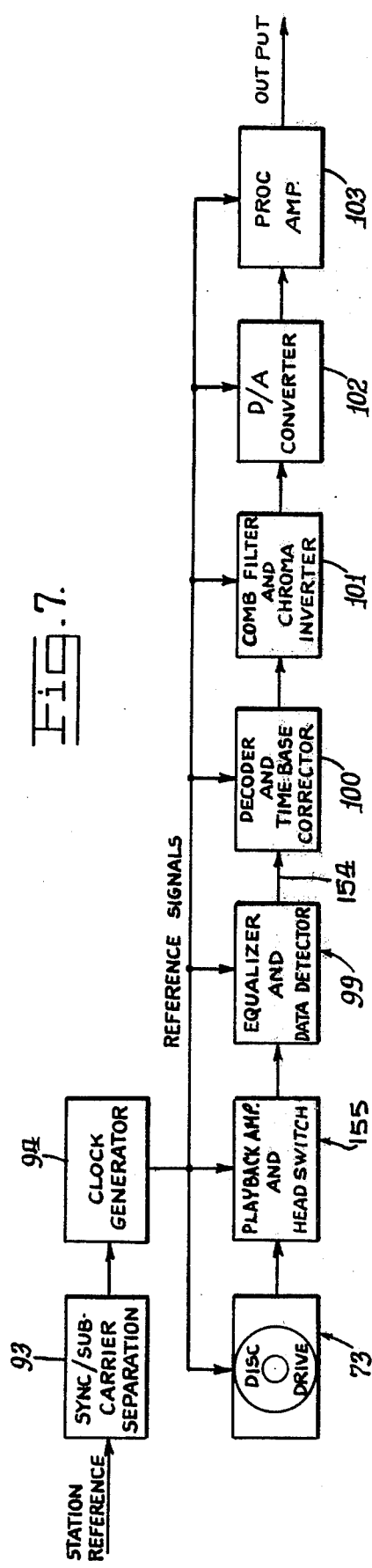
FIG. 7 is a functional block diagram broadly illustrating the signal flow path through the apparatus during a playback operation.

During playback and referring to FIG. 7, the heads read, i.e., reproduce the digital video information from the eight surfaces per field and obtain the recorded channel encoded digital video signal from the two fields forming each picture frame. The reproduced signal is applied to a playback amplifier circuitry and head switch circuitry 155 associated with the selected disc drive 73 which amplifies the data streams of digital video information carried by the eight data bit lines and applies the same to equalizer and data detector circuits 99. The equalizer compensates for phase and amplitude distortion introduced to the signal by the band limiting effects of the record and reproduce processes and insures that the zero crossings of the reproduced signal are distinct and accurately positioned. Following equalization, the channel encoded signals in each data bit line are processed for transmission to the playback circuitry of the signal system over a twisted pair line. The processed channel encoded signals are in the form of a pulse for each zero crossing or signal state transition of the channel encoded signal. The twisted pair lines for the eight data bits of the digital video information apply the processed channel encoded signals to the decoder and time base corrector circuitry 100 of one or more of the playback channels 91 of the apparatus. The decoder and time base corrector circuitry 100 reprocesses the received signals to place them in the channel encoded format, decodes the signal to the non-return to zero digital form and time base corrects the digital signal with respect to station reference to remove inter-data bit line time displacement errors (commonly referred to as skew errors) and timing distortion within each of the data streams carried by the data bit lines. Thus, the time base corrector portion of the circuitry 100 serves to align the eight bits defining a single sample and remove timing distortion in each of the data bit lines relative to station reference. It should be realized that each playback channel 91 is provided with decoder and time base corrector circuitry 100 and within each playback channel each of the eight data bit streams travels through a separate decoder and time base corrector. The output of the circuitry 100 is then applied to a comb filter and chroma inverter circuitry 101 which separates the chroma information and selectively inverts and recombines the signal for reconstruction of a four field NTSC sequence. This reconstructed digital signal is applied to a digital-to-analog converter 102 which provides an analog video signal. The new sync and burst are then added by a process amplifier 103 to produce a composite video analog output signal of the playback channel 91 as is desired. The circuit details of the playback circuitry and the disc drive control circuitry for playback operations are described in the above-identified related application, Ser. No. 763,371.

Each data bit line of the ten parallel data bit lines recorded on a disc pack 75 is channel encoded selectively by a channel encoder into the DC free self clocking channel code described in the aforementioned U.S. Pat. No. 4,027,335 or the self clocking channel code described in U.S. Pat. No. 3,108,261. In both codes, the NRZ-L data bit stream on a data bit line is broken into discrete bit times commonly designated as data bit cell times. For the channel code described in the U.S. Pat. No. 3,108,261, the code rules followed result in logical first bits, e.g., logical 1's to be represented by signal transitions at a particular location in the respective bit cells, specifically at mid-cell, and logical second bits or logical 0's to be represented by signal transitions at a particular earlier location in the respective cells, specifically at the beginning or leading edge of each bit cell. Any transition occurring at the beginning of one bit interval following an interval containing a transition at its center is suppressed.

In the channel code described in the above-identified U.S. Pat. No. 4,027,335, the input data stream in each data bit line may be viewed as the concatenation of variable length sequences of three types: (a) sequences of the form 1111-111, any number of logical 1's but no logical 0's; (b) sequences of the form 0111-1110, any odd number of consecutive 1's, with 0's in the first and last positions; (c) sequences of the form 0111-111, any even number of consecutive 1's preceded by a 0. A sequence is of type (c) only if the first bit of the next following sequence is a zero. Sequences of types (a) and (b) are encoded according to the code rules described in the U.S. Pat. No. 3,108,261. A sequence of type (c) is encoded according to the U.S. Pat. No. 3,108,261 rules for all bits except the last logical 1, and for this 1 the transition is simply suppressed. By this means, the type (c) sequence, viewed in isolation, is made to appear the same as a type (b) sequence, that is, the final logical 1 looks like a logical 0.

By definition, the type (c) sequence is followed immediately by a logical 0 at the beginning of the next sequence. No transition is allowed to separate the type (c) sequence from the following 0. Therefore, the special coding is distinctive for decoding purposes. The decoder must merely recognize that when a normally encoded logical 1 is followed by two bit intervals with no transitions, then a logical 1 and logical 0 should be output successively during those intervals. Other transition sequences are decoded as for the Miller code.

The encoding procedure for this code requires that a modulo-2 count be maintained of the number of logical 1's output by the encoder since the last previous 0 which was not the final bit of a type (b) sequence. If the count is 1 (odd number of 1's) and the next two bits to be encoded are 1 and 0 in that order, then no transitions are output during the next two bit intervals. If the next subsequent bit is another 0, then it is separated from its predecessor by a transition in the usual aforementioned U.S. Pat. No. 3,108,261 code fashion. This channel code provides for the transmission of data in binary form over an information channel such as a magnetic record/playback system, incapable of transmitting DC, the information being transmitted in self-clocking fashion.

With respect to the channel code, it makes no difference which binary state is considered logical 1 and which binary state is considered logical 0. In the foregoing and following descriptions the state normally marked by mid-cell transitions is considered the 1 state, whereas the state normally indicated by cell edge transitions is considered the 0 state.

The 10 data bit streams of channel encoded data, comprising 8 video data bit streams, 1 parity bit stream (if a parity bit is added) and 1 data track bit stream, transmitted by a disc drive 73 (FIG. 7) over a transmission line bus 154 are received by one or more of the playback channels 91 (FIG. 4) selected by the playback switcher 90. At the input of each playback channel, each of the 10 transmitted data bit streams is received by a separate data decoder and time base corrector included in the circuitry 100 for decoding the channel encoded data back to the NRZ-L form of digital code and then time base correcting the NRZ-L data to remove any intra channel and inter channel bit time displacement errors that may be present in the received data streams. Bit time displacement errors result from the data transmission channel acting on the transmitted data to introduce intersymbol interference and reflections caused by impedance discontinuities in the transmission channel. This disturbs the timing of the data transmitted in the channel. In a video recorder data transmission channel, bit time displacement errors commonly are a result of changes in record medium dimensions, usually caused by environmental changes, of differences in the relative head to medium record and reproduce velocities of the relatively transported head and record medium and of machine to machine mechanical variations resulting in geometric differences between the heads and record medium. Video disc recorders utilizing rigid record media, such as the disc packs 75 used in the apparatus described herein, ordinarily do not cause large time displacement errors in the transmitted apparatus, particularly, at the data rates common for analog type video disc recorders that are in wide use today. The rigid record media used in such recorders are dimensionally stable and the servo mechanisms used are able to maintain the relative transport of the heads and rigid record media within sufficient tolerances so that time displacement errors are kept small. In some applications of video disc recorders, the time displacement errors are so small as to be insignificant and time base correction is not necessary.

However, as described herein, the present apparatus in which the time base corrector circuitry is used employs (with little modification) highly reliable disc drives that have been specifically designed and manufactured for computer data processing. Unfortunately, the computer disc drives do not maintain the relative head to disc velocity stable enough to avoid the introduction of intolerable bit time displacement errors into the data bit streams when such disc drives are used in the present apparatus to process video data. This is because the disc pack spindle in the drive is not servoed but instead is driven by a common three phase AC motor referenced to a relatively unstable line voltage and the rotational position of its disc pack is not controllable with respect to an external reference. The resulting position errors and bit time displacement errors are particularly detrimental at the high data bit rates, i.e., 10.7 MHz, required to faithfully process broadcast quality video data withour reduction in the quality of the video information. Therefore, to take advantage of the mechanical reliability of the existing computer disc drive design, the apparatus described herein is provided with a positional servo for the AC motor and time base corrector circuitry to remove any unacceptable time displacement errors introduced into the data bit streams rather than altering the reliable design of the computer disc drives.

As described above, before the received data bit streams are time base corrected, each channel encoded data bit stream is decoded back to its original NRZ-L digital form. For this purpose, and with reference FIGS. 9A and 9B, the data decoder and time base corrector circuitry 100 includes for each data bit line a channel decoder circuitry portion 525 having a pair of input terminals 526 coupled to the playback switcher 90 (FIG. 7) for receiving channel encoded data, which as described hereinbefore, is in the form of channel encoded transition related pulses. The pair of input terminals 526 are coupled to a differential amplifier line receiver circuit 527 connected to reject common mode noise in the pair of complementary transition related pulses received from the transmission line pair included in the transmission line bus 154. In addition, the differential amplifier line receiver circuit 527 regenerates a single transition related pulse from each transmitted pair of complementary transition related pulses so that the regenerated pulse has a well defined leading edge properly positioned according to the code rules of the channel code selected for originally encoding the video NRZ-L data. More specifically, the differential amplifier line receiver circuitry 527 provides a single regenerated transition pulse with leading and trailing edges provided when the levels of the edges of the received complementary pulses are the same. By examining the edges of the transmitted complementary pulses in this manner, the leading edges of all regenerated pulses will be properly positioned according to the channel encoding rules because the same sense, i.e., leading positive going and leading negative going, edges of each pair of the complementary pulses are employed to define the occurrence of the leading edge of each regenerated transition related pulse. Because the transmission channel through which the transition related pulses are sent to the decoder circuitry 525 affect identical pulse edges the same, any time distortion introduced to the pulse edges will not effect the regneration of the transition related pulses.

Following the regeneration of the transition related pulses, they are coupled over line 528 to clock a one shot multivibrator 529 at each occurrence of a regenerated pulse, using the defined leading edge to effect clocking. The one shot 529 is rapidly switched from its stable conduction state to its quasi-stable conduction state to provide the precisely defined leading edge of the transition related pulses. The one shot 529 has one of its outputs connected to line 530a that extends to the clock input of a divide by two flip flop 531. Upon the occurrence of each regenerated transition related pulse, the flip flop 531 is rapidly switched between its two stable conduction states by the leading edges of the regenerated pulses and thereby converts the pulse form of the channel encoded data to the level form for subsequent decoding of the data back to its original NRZ-L digital form as will be described hereinbelow.

The one shot 529 provides complementary outputs of the channel encoded data on line 530a and 530b. The complementary outputs are coupled to a 6 SC clock generator 532 which provides complementary 6 SC clock signals on its output lines 533 and 534 for use by the data decoder circuitry 525 for decoding the received data. In accordance with the present invention, the clock generator includes a 6 SC voltage controlled oscillator 537 which is locked by an operatively associated phase detector 535 to the phase of the data clock carried by the channel encoded data. The complementary transition related data pulses output by the one shot 529 on lines 530a and 530b are coupled to the input of the phase detector 535, which has its output on line 536 coupled to the control input of the 6 SC voltage controlled oscillator 537. The phase detector 535 examines the phase of the 6 SC clock provided by the oscillator 537 with respect to the received and regenerated transition related data pulses and provides an error correction signal to the oscillator via the phase error smoothing capacitor 538. A change in the phase of the received data causes the phase detector 535 to change the average voltage level on the capacitor 538 by a corresponding amount and thereby cause the phase of the 6 SC clock provided by the voltage controlled oscillator 537 to be adjusted to the phase of the clock carried in the channel encoded data.

The phase detector 535 of the present invention includes a pair of matched current sources 540 and 541, each having an output line 542 and 543 respectively connected to the line 536 coupled to the error averaging capacitor 538. In the absence of a transition related data pulse, the line 530b extending from the one shot 529 is high, which enables the current source 541. Because the base electrodes of each transistor of the differential pair forming a current switch 545 at the output of the current source 541 are grounded, the current provided by the current source 541 divides equally in the two current paths defined by the current switch 545. Current in the path defined by the current switch 545 connected to the output line 543 flows onto line 536 to charge the error smoothing capacitor 538 to a level which, when a data stream is not input to the decoder circuitry 525, will cause the voltage controlled oscillator 537 to provide a 6SC clock at a nominal frequency and phase. Thus, even in the absence of a data bit stream at the input of the decoder circuitry 525, a 6SC clock is provided at its nominal frequency. This facilitates rapid synchronization of the oscillator 537 to the data clock when a data bit stream is initially received and proper decoding of the channel encoded data.

When a transition related data pulse is received on the input line 526, the one shot responsively provides a high level signal on line 530a and a low level signal on line 530b for an interval determined by its time constant circuit 529a, which for the decoder circuit described herein is about 17 nsec. The low level signal on line 530b disables the current source 541, thereby terminating the provision of charging current through the current switch 545 to the error smoothing capacitor 538. However, the high level signal on line 530a enables the other current source 540, which provides charging current to the error detection capacitor 538 in accordance with the relative conduction periods of the halves 544a and 544b of a current switch 544 formed by the transistors arranged in circuit as a differential pair. The transistors forming the two halves 544a and 544b of the current switch have their respective base electrodes coupled to receive the 6SC clock provided over line 533. When the clock is at a low level, transistor 544a is disabled. However, the other transistor 544b is allowed to conduct because the long time constant RC circuit 547 holds the voltage at its base electrode at an average voltage level which is more positive than the low level of the 6SC clock. Consequently, all of the current furnished by the current source 540 will flow through the one enabled transistor 544b to the output line 542 of the current source 540.

When the 6SC clock goes high, the base of the transistor 544a goes more positive than the base of the transistor 544b. Therefore, transistor 544a is enabled and transistor 544b disabled. This removes the current flow to the error smoothing capacitor 538. If the transition related data pulse received by the current source 540 is positioned in time relative to the 6SC clock provided to the current switch 544 so that low to high level transitions in the 6SC clock occur at the center of the transition related data pulses, each transistor 544a and 544b of the current switch will be enabled for equal intervals and the voltage on the error detection capacitor 538 will be maintained at an average level corresponding to a correctly phase 6SC clock. Any change in the data bit rate of the received channel encoded data bit stream changes the position of the transition related pulses at the input to the current source 540 relative to the low to high level transitions of the 6SC clock at the input to the current switch 544. If this occurs, one of the transistors of the current switch 544 will be enabled during the period that the current source 540 is enabled (by the transition related pulse) for a longer interval than the other transistor, with one of the transistors enabled for a longer interval depending upon whether the data bit rate increased or decreased. This causes a corresponding change in the current provided to the error smoothing capacitor 538 and a corresponding corrective change in the average voltage level on the capacitor. A change in the voltage level on the capacitor causes the voltage controlled oscillator 537 to change its phase and frequency until the transition related pulses are centered with respect to the low-to-high level change in the 6SC clock provided to the current source 540. With the low to high level change in the 6SC clock adjusted to be centered with respect to the duration of the transmission related pulses, the two halves, 544a and 544b, of the current switch will individually pass current from the current source 540 for equal intervals. Hence, the average voltage on the capacitor 538 will be maintained at the level required to lock the frequency and phase of the 6SC oscillator 537 to the data clock rate of the received channel encoded data.

After the divide by two flip flop 531 converts the channel encoded data from the transition related pulse form to the channel encoded NRZ-L form, the data is coupled by line 531a to a pair of latches 551 and 552 (FIG. 9B) at the input of the decoding circuitry 525a. The decoding circuitry is able to decode data that is channel encoded according to the code rules of the U.S. Pat. No. 3,108,261 (FIG. 9E (1)) and 4,027,335 Patent (FIG. 9E-(2)). The latches are clocked by $\phi1$ and $\phi2$ 3SC clocks, respectively, derived from the 6SC clock generated by the oscillator 537.

The 6SC clock on line 534 is coupled to one input of each of the NAND gates 553a and 553b. The other input of each of the NAND gates receives complementary 3SC square waves generated by the divide by two flip flop 534a from the 6SC clock on line 534. The NAND gates are enabled when their inputs are low to issue the positive $\phi1$ (FIG. 9E-(4)) clock pulses to clock the latch 552 and positive $\phi2$ (FIG. 9E(3)) clock pulses to clock the latch 551. The $\phi1$ and $\phi2$ clock pulses are displaced in time by one half cycle of 3SC. Hence, the time that the level of the channel encoded NRZ-L data on line 531a is latched by latch 551 is displaced one half cycle of 3SC from the time the level is latched by latch 552 (FIG. 9E-(5) and (6)). Both latches are coupled to the two inputs of an exclusive OR gate 554a. The exclusive OR gate serves to detect the occurrence of a change in state in the level of the channel encoded NRZ-L data at the input of latches 551 and 552 between the times they are clocked by the displaced $\phi1$ and $\phi2$ clocks (FIG. 9E-(7)). To determine if the change in state at the input of latches represented a logical 1 bit, the output of the exclusive OR gate 554a is coupled to one input of a NAND gate 555. The other input of the NAND gate receives inverted $\phi1$ 3SC clock pulses coupled from the NAND gate 553a by the inverter 555a. If the change in state at the input of the latches represents a logical 1 bit, the output of the exclusive OR gate 554a will be low at the occurrence of an inverted $\phi1$ 3SC clock pulse. The NAND gate 555 will be enabled, placing a high level on its output. To assure safe latching of the detected logical 1 bit pulse at the output of the NAND gate 555, a delay circuit 556 is connected to the input of the NAND gate 555 receiving the inverted $\phi1$ clock so that the output of the NAND will be maintained high for an interval longer than the $\phi1$ 3SC clock pulse (FIG. 9E-(8)). This permits the following latch 557 to be clocked with the positive trailing edge of the $\phi1$ 3SC clock to latch the delayed high level provided by the NAND gate 555 (FIG. 9E-(9)). If the input data is channel encoded according to the U.S. Pat. No. 3,108,261 code rules, the output of latch 557 will be the channel decoded NRZ-L data. This is represented by the dotted lines in the timing diagram shown by FIG. 9E. In the decoder shown by FIGS. 9A and 9B, however, an additional latch 558 is needed to permit the decoding of data channel encoded according to the code rules of the aforementioned U.S. Pat. No. 4,027,335. However, for the U.S. Pat. No. 3,108,261 channel code, the additional latch 558 only delays the output of the decoded data by one cycle of 3SC.

When data is encoded according to the code rules of the U.S. Pat. No. 4,027,335, specified logical 1 bit related transitions are suppressed. If a logical 1 bit related transition has been suppressed, there will be an absence of data transitions for an interval greater than 1½ cycles of 3SC. This is detected by a modulo-4 counter 559 having its clock input coupled to receive $\phi0$ clock pulses provided by the NAND gate 553b and its reset input to the output of the edge detecting exclusive OR gate 554a. The exclusive OR gate 554a provides a reset pulse to clear the counter 559 each time a transition occurs in the channel encoded data (FIG. 9E-(10)). The output of the modulo-4 counter 559 is coupled to one input of an AND gate 560 which also receives $\phi0$ clock pulses at its other input. Both inputs are low ½ cycle of 3SC after the modulo-4 counter has counted four $\phi1$ 3SC clock pulses without being reset, which corresponds to an absence of data transitions for an interval of 2½ cycles of 3SC (FIG. 9E-(11), (12) and (13)). Ordinarily, this signifies that a logical 1 bit has bit suppressed in the channel encoded data. To make certain that no errors have been introduced to the data stream, a following NAND gate 561 examines an output of the latch 558 at the time when AND gate 560 provides the low state signal representing a suppressed logical 1 bit. If the examined output of the latch 558 is also low, it verifies that a logical 1 bit has been suppressed and a pulse is output on line 562 (FIG. 9E-(14)) by the NAND gate 561 that is wire ORed with the output of latch 557. Line (14) of FIG. 9E represents the state of NAND gate 561 as if it was not wire ORed with the output of latch 557. The second pulse 563 (FIG. 9E-(147) provided by the NAND gate 561 occurs at the time of and is latched into the latch 558 by the $\phi1$ 3SC clock. This prevents the output of the latch 558 from being returned low, thereby, inserting the suppressed logical 1 bit into the decoded NRZ-L data appearing on line 566. In the data track bit line, the decoded data is coupled by line 566 to the computer control system 92 (FIG. 4). The decoded data clock provided by the flip flop 534a on line 574 and the line 1D or sync word from the first shift register and sync word detector circuitry 572 are also coupled to the computer control system 92.

If the phase of the 3SC decoded clock provided by the flip flop 534a is incorrect, a one-shot multivibrator 534b is enabled by the coincidence of the 6SC clock on line 534 and a pulse provided on line 564. This pulse will be generated 3 cycles of 3SC before the line ID is first detected by sync word detector portion of the circuitry 572 included in the time base corrector 565 if the level of the decoded data at that time is low, therefore, incorrect. A counter 590 (FIGS. 8A and 9C) receives 3SC decoded data clock and, as will be described hereinbelow, provides an advanced end of count pulse at H/2 rate, designated advanced EOC pulse, on line 591. Because of the known data bit pattern of the sync word interval, which interval ordinarily occurs when the advanced end of count pulse is generated, the decoded data level can be examined at the shift register portion of the circuitry 572 to determine if decoding is performed correctly. The gating circuitry 592 issues a pulse on line 564 when the examined decoded data level is low that enables the one-shot 534b to provide a disabling signal at the clock input of the flip flop 534a for one cycle of 6SC. This results in a shift in the phases of the $\phi 1$ and $\phi 2$ clocks by $\frac{1}{2}$ cycle of 3SC, thereby establishing the right phase for correct decoding of the channel encoded NRZ-L data.

During playback operations, each bit stream of channel decoded NRZ-L data provided at the output line 566 of the decoder circuitry 525 will contain time base errors in the form of bit time displacement errors as previously described. Furthermore, bit line to bit line or skew time displacement errors will be present in the 9 data bit streams that carry the 8 parallel bits of digitized video and 1 parity bit, if included. To remove these bit time displacement errors from the NRZ-L data, a time base corrector 565 is provided, a portion of which is shown in FIGS. 9A–C, in each data bit stream and corrects such errors by electronically adjusting a variable delay through which the NRZ-L data is passed. Each time base corrector contains circuitry which processes the received data so that the data bit rates in all video data and parity bit lines are frequency and phase coherent with respect to the reference 3SC provided by the clock generator 94 (FIG. 7) for the playback channel 91. Furthermore, each of the time base correctors also aligns the data bits in the data bit lines with respect to a common H/2 reference provided by the playback channel's clock generator 94 (FIG. 7). As a result of these combined functions, any relative time displacement errors between the data bits in the 9 bit lines are removed, i.e., line to line or skew errors removed, and any bit time displacement errors within a bit line corrected.

A part of the time base corrector circuitry is employed to determine if the correct 3SC decoded clock phase is provided the flip flop 534a and, if not, to establish the correct phase. To obtain the correct 3SC decoded data clock phase, and channel decoded data in each of the data bit lines is directed through a phaser 567. All of the phasers in all of the data bit lines are clocked by a common stable reference 3SC clock provided by the clock generator 94 (FIG. 7) to retime the data to a stable clock signal. In the illustrated embodiment, a multiple port shift register 568 performs the retiming by having data written into addresses determined by the write address generator 569 clocked by the decoded 3SC data clock provided by the channel decoder 525 on line 574. The data is read out of the register 568 under the control of the read address generator 570 clocked by the reference 3SC clock provided on line 571 by the clock generator 94 (FIG. 7). Because all of the phaser read address generators 570 in the 9 data bit lines are clocked by the same reference 3SC clock, the data in all of the data bit lines are retimed to the desired stable 3SC reference clock, which for an NTSC television signal standard is 10.7 MHz.

The write and read address generators 569 and 570 are preset and reset respectively to their starting addresses by the sync word included in the data being decoded, with the starting write address in advance of the starting read address by four addresses. Each time a sync word is detected in the received decoded data by the first shift register and sync word detector circuitry 572, a reset signal is provided and coupled to reset the read address generator 570. The decoded data on line 566 enters a seven bit shift register included in the circuitry 572 and is examined by logic circuits forming the sync word detector portion of the circuitry 572 for the occurrence of the 7-bit sync word pattern. After passage through the shift register, the data is clocked into the multiple port shift register 568. The register 568 has an 8 bit capacity and is intially operated to read an address four 3SC cycles following writing of data at the address. Because the write address generator 569 is clocked by the 3SC data clock and the read address generator 570 by the reference 3SC clock, data bit displacement errors in the received data will change the time an address has data written into it relative to the time the address is read. This change in the time between writing data at an address and reading data from the address results in the received data being retimed to the stable 3SC reference. Furthermore, the phaser 567 will properly retime the received data to the stable 3SC reference even if the sync word is not detected by the first sync word detector 572 as long as unanticipated large time displacement errors do not occur that exceed the storage capacity of the register 568. Even if large time displacement errors occur, the video data emerging from the phaser 567 will be at the proper reference 3SC rate although incorrectly positioned in phase.

The sync word detector 572 provides a first input to the gating circuitry 592 each time a sync word is detected in the decoded data. The seven bit shift register is clocked by the decoded data clock on line 574 to enter the decoded data received over line 566 for examination by the logic circuitry. The sync word detector 572 is enabled for sync word detection by the sync word enable pulse generator 600. This generator is enabled by a divide by 1364 counter 590 clocked by the 3 SC decoded data clock on line 530. The generator 600 provides a sync word detection enable pulse on line 601 (FIG. 8B-(3)) which is initiated by the advanced EOC pulse (FIG. 8B-(2)) issued by the counter 590 issued over line 591 three counts in advance of the expected occurrence of a sync word at the first sync word detector circuitry 572 (FIG. 8B-(6)). This advanced EOC pulse also is coupled by line 591 to the gating circuitry 592 that responsively examines the output of the shift register to determine the data logic level and, hence, the phase of the decoded data clock. Upon the detection of a sync word by a second sync word detector 575 (FIG. 8B-(6)), a reset signal is issued over line 608 to the generator 606. The reset signal terminates the enable pulse on line 601 before the counter 590 reaches a count of fifteen. The counter position 15 in the counter 590 terminates the enable pulse if a sync word is not detected by the second sync word detector 575 (FIG. 8B-(7)). The shift register 604 provides the automatic EOC reset pulse to the counter 590 over line 610 upon the occurrence of the third 6SC clock pulse following the advanced EOC reset pulse (FIG. 8B (2) and (5)). The shift register 604 and the pulse generator 605 cooperate to allow the sync word enable pulse to follow changes in the time of the occurrence of consecutive sync words in the amount of $\pm 1$ cycle of 3 SC. The pulse generator 605 simultaneously examines three outputs of the shift register 604 and generates a gating waveform (FIG. 8B-(4)) that prevents the sync word enable pulse from resetting the counter if it occurs within 1 clock time of the occurrence of the automatic EOC reset pulse generated by the shift register 604. If the reset enable pulse derived from a sync word arrives one count before the automatic EOC reset pulse, the counter 590 will not be reset (FIG. 8B-(4) and (8)). If the reset enable pulse is provided one count after the occurrence of the EOC reset pulse, the counter 590 will not be reset again (coincidence with the second positive pulse of the gating waveform provided by the pulse generator 605). If a sync word is not detected during the interval of the sync word enable pulse, the counter 590 will continuously reset itself through shift register 604 and line 610 (FIG. 8B-(5)) and, thereby, with and generator 600 retain, as a memory, knowledge of when to provide sync word enable pulses until a sync word is detected. As long as the detected sync word is not in coincidence with the positive gating waveform (FIG. 8B-(4)) provided by the generator NAND gate, 612 is enabled to permit the sync word to be placed on line 613 for resetting the counter 590.

The vertical blanking signal on line 606 (FIG. 8B-(1)) is coupled to place the sync word enable pulse generator 600 in the enabled state for an interval of ten horizontal lines by disabling gate 611 and prevent the coupling of the count 15 position of the counter 590 to generator 600. This enables the decoder/time base corrector circuitry to lock onto the sync word detectors 572 and 575 to be enabled at sync word time and set the phaser 567 and error gate 582 for proper operation.

The data is read from the multiple port shift register 568 with the 3 SC reference clock into the shift register portion of the second sync word detector circuitry 575. The shift register of the sync word detector circuitry 575 is coupled by lines 608 and 576 to the portion of the data decoder and time base corrector circuitry 100 that completes the time base correction of the reproduced and decoded data shown in FIGS. 8A, 9C and 9D. Details of that portion of the circuitry is described in the above-identified related application, Ser. No. 763,371.

What is claimed is:

1. Apparatus for phase locking a clock signal to a self clocking data stream having data distributed in regularly occurring data cell intervals, said data defined by a data pulse occurring in the data cell interval with the data pulse interval less than the cell interval, said apparatus comprising:

an oscillator for generating said clock signal, said oscillator responsive to control signals to generate a clock signal of a frequency and phase varying in accordance with the control signal applied thereto;

first means coupled to said oscillator for supplying said control signal in response to a current being applied thereto;

second means for supplying a predetermined level of current to said first means, said second means responsive to said data stream to supply said predetermined level of current when data pulses are absent from said data stream, said first means responsive to said predetermined level of current to supply a control signal to said oscillator that maintains the frequency of said clock signal substantially at a predetermined rate, said second means rendered inoperative in response to the presence of said data pulses in said data stream; and third means for supplying a variable interval of current to said first means in response to the occurrence of said data pulses and said clock signal, said third means enabled to supply current to said first means in response to the occurrence of data pulses and disabled from supplying current to said first means in response to the occurrence of a selected signal transition of said clock signal during the interval of said data pulse, the interval of current supplied by said third means varying with the time of occurrence of said selected signal transition during said data pulse interval, said first means responsive to the interval of current supplied by said third means to supply another control signal to said oscillator that maintains the frequency and phase of said clock signal so that said selected signal transition of said clock signal is maintained at the midpoint of said data pulse interval, said third means rendered inoperative in response to the absence of said data pulses.

2. Apparatus as defined in claim 1 wherein said oscillator is a voltage controlled oscillator responsive to voltage level control signals to generate said clock signal of variable frequency and phase; and said first means is responsive to applied current to supply a voltage level control signal to said voltage controlled oscillator, said first means is reponsive to said predetermined level of current supplied by said second means to supply a predetermined voltage level control signal to said voltage controlled oscillator that maintains a frequency of said clock signal substantially at said predetermined rate, and said first means is responsive to the interval of current supplied by the third means to supply another voltage level control signal which voltage level varies in accordance with the duration of the current interval.

3. Apparatus as defined in claim 2 wherein said second means includes a first current source coupled to receive clock pulses obtained from said voltage controlled oscillator and said data pulses and responsive to said clock pulses in the absence of data pulses in said data stream to supply said predetermined current level signal to said first means; and said third means includes a second current source and a switch means providing alternate current paths for current supplied by said second current source, a first alternate current path coupling said second current source to said first means, a second alternate current path coupling said second current source to by-pass said first means, said switch means responsive to the occurrence of a data pulse to couple said second current source to said first alternate path and to the occurrence of a selected signal level transition in said clock pulse to couple said second current source to said second alternate path.

4. Apparatus as defined in claim 3 wherein said second current source supplies current at a level of about two times greater than the level of current supplied by the first current source.

5. Apparatus as defined in claim 2 wherein said data pulses and clock signal are rectangular pulses with leading and trailing level transition edges, said third means enabled to supply current to said first means in response to each data pulse, said third means disabled from supplying current to said first means in response to the first to occur as between the termination of said enabling data pulse and the occurrence of a selected level transition edge of said clock pulse signal.

6. Apparatus as defined in claim 5 wherein data pulses occur at boundary edges and midpoints of data cell intervals of said data stream, the frequency of the clock pulses generated by said oscillator is equal to two times the data cell interval rate, each clock pulse is coupled to said second means and third means to terminate the supply of current to the first means by said third means if previously enabled to supply said interval of current by a data pulse and to enable the supply of current to the first means by said second means if said third means not enabled to supply said interval of current.

* * * * *